United States Patent

[11] 3,575,251

[72] Inventor Alvin E. Moore
 916 Beach Blvd., Waveland, Miss. 39576
[21] Appl. No. 796,482
[22] Filed Feb. 4, 1969
[45] Patented Apr. 20, 1971

[54] LIGHTWEIGHT, WRECK-RESISTANT CAR
 30 Claims, 22 Drawing Figs.
[52] U.S. Cl. .................................................. 180/30,
 115/1, 293/1, 296/31
[51] Int. Cl. ........................................................B62k 19/16,
 B60f 3/00
[50] Field of Search.......................................... 280/293,
 150; 296/31, 1, 28; 244/1, 2, 107; 115/1; 9/2;
 293/1; 180/30

[56] References Cited
UNITED STATES PATENTS

| | | | |
|---|---|---|---|
| 1,484,410 | 2/1924 | Pridgen | 115/1 |
| 3,189,301 | 6/1965 | Parkes | 244/107X |
| 3,236,323 | 2/1966 | Austin | 180/30 |
| 3,237,218 | 3/1966 | Moore | 9/2 |
| 3,465,840 | 9/1969 | Summers | 130/30 |

Primary Examiner—Kenneth H. Betts
Attorney—Alvin Edward Moore

ABSTRACT: A vehicle, especially adapted for land travel, having strong, lightweight walls, comprising thin metal, cylindrical or corrugated cans, between skins, and surrounded by foamed plastic. These receptacles are sealed, thin-walled pipes or tubes; or rows of aligned short cans, end-to-end-glued together. The skins may be: metal sheets, epoxy glued or brazed to the cans; or metallic mesh attached to the cans by brazing or glue and/or bolts, coated with stucco. Optionally, each of the rows may comprise a plurality of aligned cans with adjoining end-caps that are strongly glued together, or a single, elongated, preferably corrugated tube.

This invention pertains to lightweight and strong vehicles. Although its basic structure may be utilized in water-traversing vehicles, it is preferably incorporated in a wheeled vehicle, adapted for use on the land and also optionally in the air and in amphibious operation. One of its features comprises stabilization against roll of a two-wheeled or three-wheeled vehicle by providing balloon-lift approximately above its center of gravity.

PATENTED APR 20 1971
3,575,251
SHEET 1 OF 3
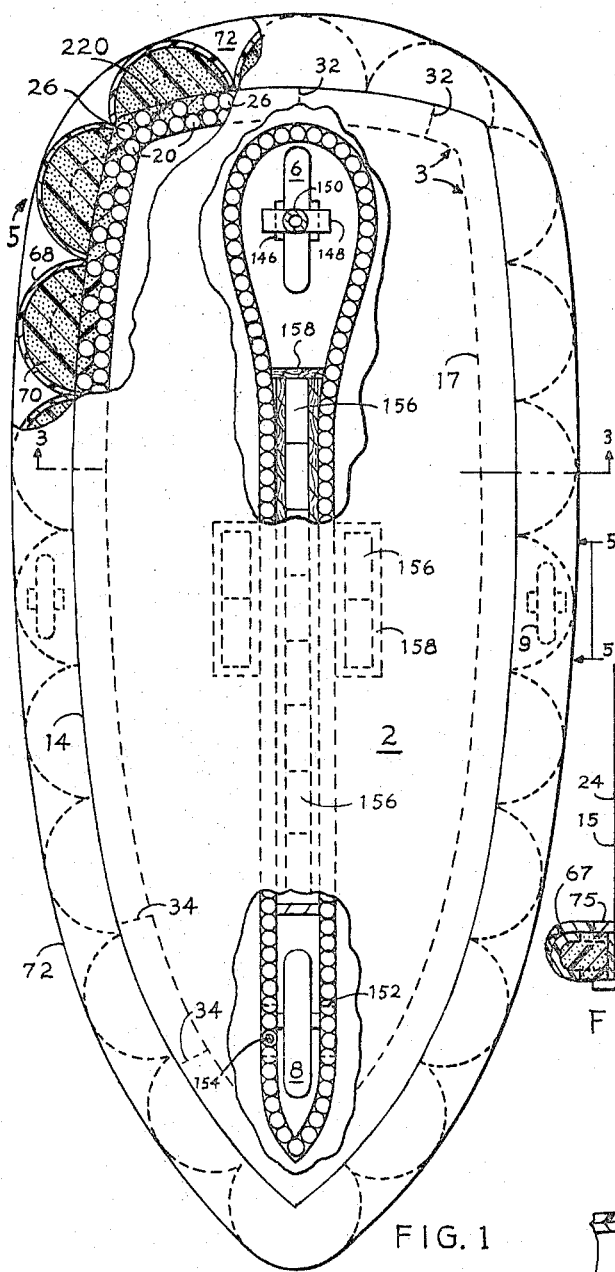
FIG. 1
FIG. 2
FIG. 2A
FIG. 3
FIG. 4
FIG. 5
FIG. 6
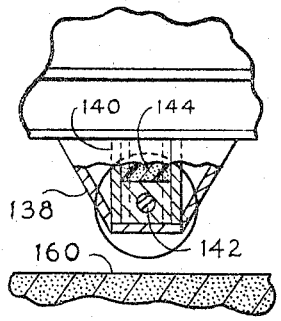
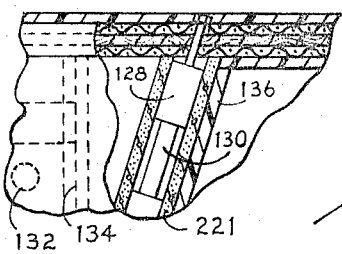
ALVIN E. MOORE,
INVENTOR.
BY
*Alvin E. Moore,*
ATTORNEY.

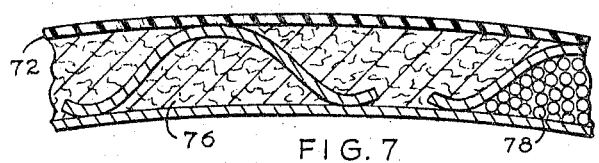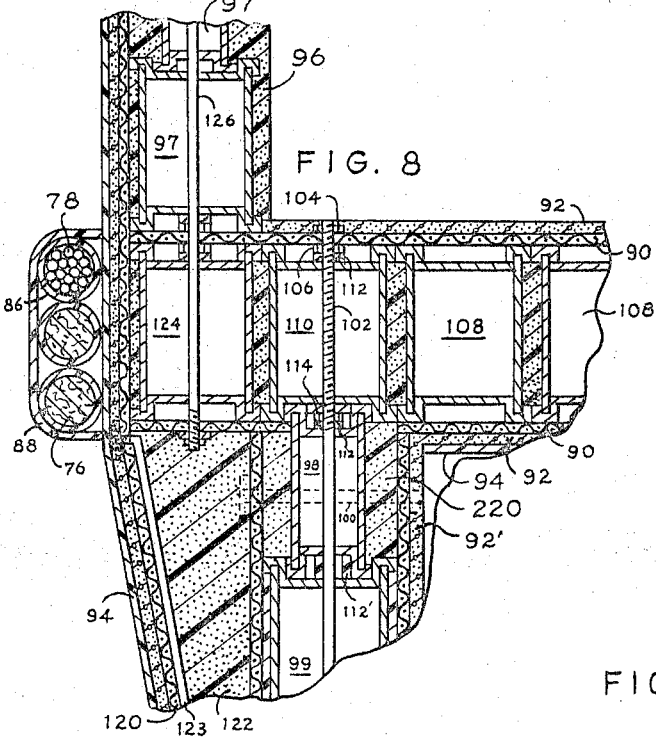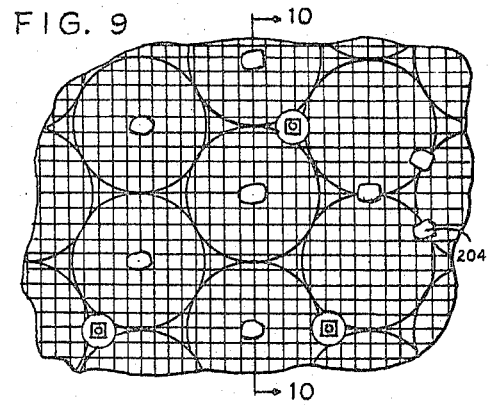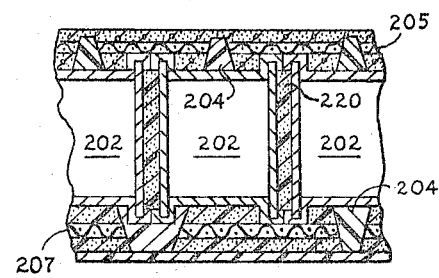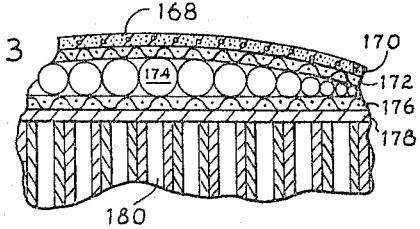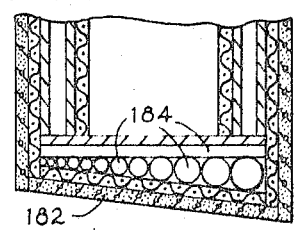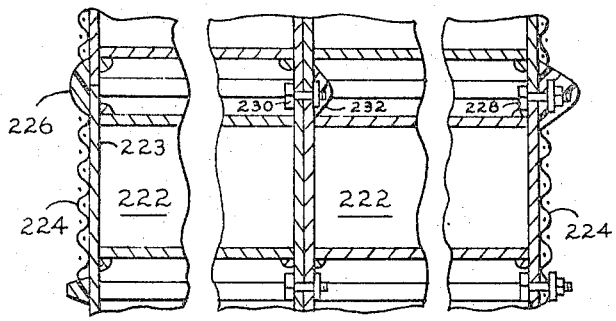

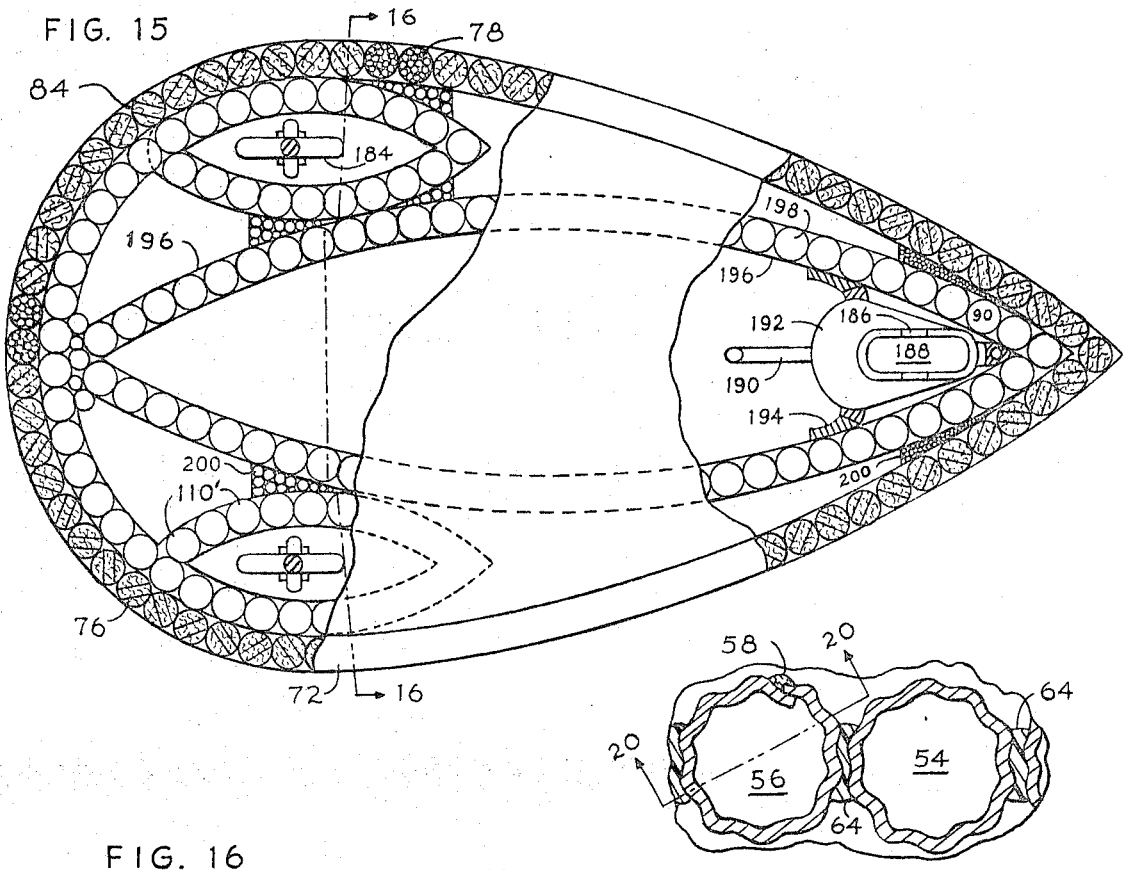

LIGHTWEIGHT, WRECK-RESISTANT CAR

This invention pertains to a lightweight, strong, preferably wheeled vehicle, capable of lessening or eliminating damage in crashes. Although its basic structure may be utilized in other craft, in this invention it is preferably incorporated in a wheeled and/or skid-bottomed vehicle, for example in an automobile, trailer, golf cart, rail-utilizing car (for instance, with especial reference to FIGS. 1 to 5, in a monorail vehicle), wheeled aircraft of hovercraft, spacecraft or snowmobile.

Such vehicles of currently standard construction are heavy, require much propulsive power because of their weight, and are very subject to damage, with much loss of life and maiming of passengers. And when a risky and costly effort is made to reduce vehicular weight—in aircraft for example, with common thin aluminum construction elements—the reduction frequently only increases the vulnerability of the conventionally designed craft. The need for a vehicle that is cushioned to absorb the shocks of severe impacts and has a passenger-protecting, very strong but very lightweight interior, is a drastic emergency in the civilization of our time.

In view of these facts, this invention has, among other objects, the following objectives: (1) a relatively lightweight but extremely strong vehicle, preferably adapted to traverse land at least part of the time of its travel; (2) such a vehicle having firm, strong, inner load-carrying structure and outer impact-cushioning structure that protects its walls against fracture and collapse in crashes or severe storms; (3) a land-traversing vehicle having walls comprising frames of strength-providing, tubular receptacles of rigid material; (4) a car having, frame structure comprising rows of end-to-end-joined cans, having much strength for given row weight at the joints between can-end caps; (5) vehicular structure comprising corrugated, sealed, lightweight tubular receptacles containing gaseous material under pressure above that of the atmosphere; (6) a vehicle having in its top part balloons that aid in stabilizing it against rolls and pitching; and (7) a safe, stabilized car, having only two wheels that contact the ground except when tipping over or, optionally, having three ground-engaging wheels.

Other objects and the specific structure of the invention will become apparent from the following specification, and from the accompanying drawings, in which:

FIG. 1 is a plan view of the invented vehicle, having forward and after portions broken away and in section along a horizontal plane between the top and the deck of the craft.

FIG. 2 is a detail, sectional view of a portion of a row of endwise joined cans, partly broken away.

FIG. 2A is a detail, sectional view of an optional, corrugated type of can that may be utilized either in the type of row shown in FIG. 2 or in an elongated, tubular, vehicular frame element.

FIG. 3 is a sectional view of the vehicle from the plane 3-3 of FIG. 1, but showing optional plywood instead of the metal sidewall sheets of FIG. 1.

FIG. 4 is a detail view in horizontal section, partly broken away, of one form of impact-cushioning shield around the vehicle.

FIG. 5 is a detail, elevational view from the plane 5-5 of FIG. 1, partly broken away in vertical section, of a sidewheel portion of the vehicle, showing the sidewheel as clear of the ground.

FIG. 6 is a detail view, partly broken away and partly in vertical section, of an alternative type of support for the sidewheel of FIG. 5.

FIG. 7 is a detail view in horizontal section, partly broken away, of another form of impact-cushioning shield around the vehicle.

FIG. 8 is a detail view in vertical section of a portion of an optional form of the craft, at a junction between its deck and a sidewall, and illustrating an optional form of the sidewheel support and an optional form of the impact-cushioning shield.

FIG. 9 is a detail view, partly broken away, indicating, when considered as in top plan view, the frame of a horizontal deck (and, when considered as in elevational view, of an upright vehicle wall that optionally may be utilized instead of that of FIG. 3 or 8), the frame being shown before stucco or like material is applied to the metallic mesh.

FIG. 10 is a view in section from the plane 10-10 of FIG. 9, partly broken away.

FIG. 11 is a detail, sectional, plan view, partly broken away, of an optional corrugated form of the tubular receptacles, shown as fixed between sheets of mesh that are parallel to the longitudinal axes of the receptacles.

FIG. 12 is a detail, sectional view of corrugated tubular receptacles, shown as broken away in their middle parts and as fixed between sheets of mesh that are perpendicular to the longitudinal axes of the receptacles. These tubular elements may be of the elongated or short type of cans.

FIG. 13 is a detail, vertical view in fore-and-aft section along an exterior wall of the vehicle of FIG. 1 or FIG. 15, showing the top of the vehicle as optionally shaped in winglike fashion—aerodynamically curved to exert a lifting force on the craft.

FIG. 14 is a detail, sectional view from a vertical fore-and-aft plane thru the vehicle, generally indicating an optional aerodynamic lower surface of the bottom of the craft, for exerting a lift on it.

FIG. 15 is a plan view, partly in section along a horizontal plane, of another form of the invented vehicle.

FIG. 16 is a sectional view in elevation from the planes 16-16 of FIG. 15.

FIG. 17 is a partly broken-away detail view in section from a plane along the axes of two cans, bonded together in an optional form of the rows of cans.

FIG. 18 is a partly broken-away, detail, sectional view of a portion of one of the tubular wall elements (of a row of joined cans), shown before it is assembled with other elements in a wall or deck.

FIG. 19 is a detail view of part of an optional type of deck or wall frame, in section along a plane that is transverse to the tubular receptacles.

FIG. 20 is a detail, sectional view from the plane 20-20 of FIG. 19.

FIG. 21 is a detail, sectional, reduced-scale view of a window or door.

The vehicle, as shown in FIGS. 1 and 3 comprises: a main body structure, providing inclosed load-carrying space 1, and comprising a deck 2, upright walls 3, and a top 4; an impact-cushioning shield, 5, around the body; a forward, ground-engaging steering wheel, 6; a cabin-contained steering wheel 7; a rear, driving wheel, 8; and sidewheels 9, normally clear of the ground when traveling over it.

The deck 2, as well as that of the craft of FIG. 15, may be made in any of the disclosed optional deck forms. Preferably, and as shown in FIG. 3, it comprises two layers, 10 and 11 of strong plywood glued together with epoxy resin on their adjacent faces, and preferably with reinforcing mesh of metal or strong fabric imbedded in the layer of epoxy. This mesh for example may be expanded metal (of steel or aluminum alloy), hardware cloth, lightweight poultry-type fencing or fiberglass netting. Both of the layers of plywood have the general outer shape of the vehicle, but the top layer 10 is indented from the curved margin of lower layer 11 by a distance equal to the thickness of the can-formed sidewall frame plus the thicknesses of the two layers of plywood (or optionally metal sheet) that are to sheathe that frame.

Below the composite deck structure thus formed, deck-strengthening, insulating deck cans 12 are placed. These deck cans as shown in FIG. 3 have their longitudinal axes in upright position, and like the cans illustrated in FIGS. 8, 9 and 21, they are shown as not having corrugated walls. But optionally the corrugated type of receptacles shown in any of FIGS. 2A, 11, 19 and 20 may be utilized in place of the cans 12 of FIG. 3 or of the similar deck cans of FIG. 16. Another type of deck can frame which optionally may be utilized in the deck of FIG. 3 or of FIG. 16 comprises a plurality of can rows of the type shown in FIG. 2, FIG. 17 or FIG. 18, horizontally laid alongside each other; and if bolts or rod-end screw threads of the type shown in FIG. 18 or FIG. 8 are at the ends of these rows they are projected thru holes in the lower end of the upright element (14 in FIG. 1; 15 in FIG. 3), and tensioned by nuts screwed on the bolts or rod ends) against elements 14 (or 15). In any event, the deck frame cans are preferably cemented with strong glue to the base of plywood 11, and also cemented to the deck baseplate 16, which may be either of well waterproofed plywood (for example with coats of epoxy) or of metal (for example aluminum alloy or rustproofed steel).

The upright walls 3 comprise: inner, bent, curved sheets of metal or plywood (17 or 18) that are fitted, cemented, angle-attached and screwed to plywood sheet 10; vertical frame cans (elongated tubular receptacles—for example of the type shown in FIG. 12, 13, 14, or 20—or the cans of FIG. 9 when it is considered as in elevation—or the can rows shown in FIG. 3); and outer curved sheets of metal 14 or of plywood 15.

When the upright wall sheets are of metal a single piece of the metal is fastened at the stern and unrolled, first forward to the nose of the vehicle, and then rearward back to fastened junction at the point of beginning. But when they are of plywood preferably there are three edge-joined sheets in each outer and inner sheathing (15 or 18)—two extending from the stern along the sides to the nose of the craft, and one bent in front and fastened to the forward edges of the side sheets. All the upright wall sheets are fastened by glue, angles and screws to the deck plywood, and the outer upright sheets are likewise fastened to the deck plate 16.

In FIGS. 1 and 3 two sets of upright frame rows of cans are shown. The rows of the inner set are in contact with each other and are glued or otherwise fastened to the inner, upright sheet 18; they comprise relatively large cans, 20, indicated in FIG. 3, alternating with and strongly connected to smaller cans, 22. Each of the outer rows, of cans 24 and 26, nests firmly and strengtheningly against recesses between two of the inner rows of cans. This strong nesting is indicated in the sectional part of FIG. 1.

When cylindrical cans of different sizes are utilized in these rows they preferably are of the general type shown in FIG. 2 or FIG. 18, comprising cylindrical tubes and end caps indented slightly into the tubes. Such cans are currently made in large numbers for food-packing and liquid-canning industries. Their cylindrical sidewalls are very strong for their weight; but if extra sidewall strength is desired each separately sealed can—or each flow-communicating row of cans—may be filled with air or other gas under pressure—for example, with helium, or hydrogen mixed with a combustion-inhibiting gas.

In a rotatable upright rack or similar fixture the large and small cans may be alternately stacked in rack-insured correct alignment; and the top can is clamped tightly down on the others, by a lever, bolt or vicelike screw and plate. Then epoxy resin or other very strong glue or putty 28 is applied within the upwardly projecting rims of the large cans and thus between the end caps of alternate pairs of the large and small cans. After the glue is set the fixture is turned upside down and the other pairs of end caps in the row are glued together.

When the cans utilized are of the same cross-sectional area, they are preferably fastened together in the general manner illustrated in FIG. 17. Their end caps may be soldered or glued in a rotatable horizontal racklike holder (manually or electrically rotated during the gluing or soldering). They may be slightly spaced apart, as indicated in FIG. 17; or optionally they may be jammed together. In either event, while they are thus aligned the end caps are strongly and permanently connected by brazing, soldering, welding or gluing their rims solidly together. Alternatively: the adjacent end caps of each pair of the aligned cans are slightly apart; they are supported in small teflon-lined molds that are horizontally and rigidly connected together, forming part of a stationary fixture, with a narrow mold sealingly looping around each can joint of the row; and epoxy or other strong cement is poured (by hand or machinery) into the tops of the molds and between the cans. After the mounds of glue, 30, have hardened, the row is taken from the fixture. If the cans are soldered, brazed or welded together the jig holding them in horizontal alignment is preferably turned beneath the union-forming flame by an automatically operated electric motor.

Windshield frames (rimming crack-resistant glass or plexiglass) are indicated at 32. And windowed doors may be placed at any desired locations in the upright walls, one such door being indicated at 34. The frames of these doors and the windshield are fastened between upper and lower shorter can rows (or elongated cans) in the manner that is somewhat schematically indicated in FIG. 21. To the upper and lower rows of cans (or elongated tubular receptacles), 36, the frame 38 of the windowed element (shown in FIG. 21) is strongly glued, preferably with epoxy. Also, if extraordinary strength is desired, end caps of the cans may have bolts or threaded rods attached to them; these are extended thru bores in the frame and tensioned by nuts 40 in countersinks. These screw-threaded fastening elements may be of the type indicated in FIG. 8 or FIG. 18. The door or window frame may be of metal or wood coated with epoxy or other plastic. Its sides are strongly glued (and optionally angle braced) to the elongated tubes (or rows of cans) 42.

In FIG. 18 the end can 44 of a row has a hole 46 in one of its end caps. Thru this hole the bolt 48 is inserted. Its screw-threaded end is poked thru a smaller hole in the other end cap, and it is clamped tightly in position by nut 50. Then strong glue (or solder or brazing) 52 is applied; the other cans of the row are assembled with can 44 in a racklike fixture that has a hole in one end plate for reception of the threaded part of bolt 48; and the cans are glued or soldered together. If desired a bolt also may be fixed to the end cap of the can at the other end of the row.

FIGS. 19 and 20 illustrate cans having strengthening corrugations that are sinuous in cross sections normal to the axes of the cans. These containers may be of the short type, but preferably they are elongated. They may be of extruded metal or fiberglass-reinforced plastic (for example, can 54); but preferably they are formed, like can 56, on a mandrel from corrugated sheet material, such as the aluminum or galvanized-iron roofing metal that is commonly sold in sheets or rolls; and their adjoining edges are brazed or strongly glued together as at 58.

The cans may be strongly and sealingly fixed to the deck as indicated in FIG. 20. The corrugated tube is stood on metallic mesh 60, in its proper wall place, and anchored to the deck by a bit of solder or quick-drying glue, or by an angle and screws, (or optionally they are stood on plywood of the deck); and thru its upper, open end a small amount of epoxy glue 62 is poured. Then another open-ended tube—for example, 54—is put in its proper wall place, with one of its corrugations loosely meshing with a corrugation of tube 56; it is lightly anchored in position; and between teflon-lined mold forks (not shown) epoxy glue 64 is poured. The remainder of the lower part of the hollow element wall frame is thus made; and then a cover is strongly glued (or brazed or soldered) to the tops of the cans.

An optional step in making this wall frame is the separate capping of each tube before the cover or vehicle top is fixed to their upper ends. A cap that is shaped to fit in and/or flange over each tube top is welded, brazed or glued to the top. This separate cap is especially desirable when compressed gas is to be put in the tube; in this event, an air valve is sealingly attached to the cap for inflation of the can—for example with air or helium. Instead of compressed gas, gas-cell-containing, foamed plastic, such as is shown in FIG. 2A at 66, may be utilized as the gaseous material. Any of the cans disclosed in this invention may be filled with such gaseous foam, which preferably is of the rigid or nearly rigid type. Before the can is closed, the mixed, foaming liquids are poured into it; and preferably the can ends are forcibly as well as sealingly held against the can tube after a sufficient amount of the gaseous liquid mixture is inserted to cause the gas in the final foam to be under a pressure above that of the atmosphere, thus adding to the strength of the can. Optionally, this foam-forming operation may be done in a mold, in which event the end caps may be eliminated. But such elimination is not desirable, for the end caps add considerable transverse strength to the frame cans—and especially if they do not extend from the deck to the top (or from wall to wall) but have glued together end caps in a can row. In FIG. 20, the element 62 is an end cap of epoxy; but if desired each of the corrugated tubes of FIGS. 19 and 20 may be separately closed at each end with a metal cap or a molded plastic cap, glued, brazed or welded to the tube.

As shown in FIGS. 1, 3, 4, 7, 8, 15 and 16 the invention comprises a cushioning shield which preferably extends all around it and projects outwardly from its rigid or nearly rigid, inner, load-carrying frame and skin. In FIGS. 1 and 3 this cushion comprises: a flexible upper, outer element 67, which is a flexible running board in the form of a long strip of rubber-and-fabric that is capable of withstanding wear from shod feet, and for example may be of the material commonly made for stair treads; a fabric sheath beneath and flexibly glued to this strip; and, within the fabric sheath, a plurality of arcuate, preferably semicircular, rubber and fabric resilient elements 68. These may be halves of conventional automobile tire casings that have been filled with cushioning, shock-absorbing material, 70, that will yield and absorb force when the curved, rubber-and-fabric part of the shock absorber is moved under impact. This material is shown in FIGS. 1 and 3 as weakly resilient flexible foam plastic, which preferably is placed inside the tirelike sidewalls of the semicircular spring while they are in a mold. These shock-absorbing elements may be epoxy glued or otherwise fastened at their inner upright edges to the upright cabin wall sheets 14 as indicated in FIG. 1, and then sheathed, above, outwardly and below, with rubberized fabric, 72. Alternatively, and as indicated in FIG. 3, they may be epoxy glued to a long, properly curved, plastic strip, 74; then over this strip and the springs the fabric 72 is glued; and the composite article thus formed is flexibly glued, preferably with liquid rubber cement, to sheet 15, and between plate 16 and the bar 75 (or angle 75') that is fixed to sheet 15.

Instead of the weakly resilient foamed plastic the shock-cushioning material 70 may be fibers (filaments), 76, as shown in FIGS. 4, 7, 8, 15 and 16, or may be globules, 78, as shown in FIGS. 7, 8 and 15. The fibers, optionally slightly resilient, may be for instance, of foam rubber, other foamed plastic, asbestos, fiberglass, sawdust (preferably of cedar, cypress or other lightweight wood, and dipped in wood preservative), or Spanish moss that has been boiled for its preservation. The globules may be pellets of polyethylene or other plastic or gas-expanded, baked clay or shale. Preferably the globules, pellets or fibers are crushable and somewhat permanently deformed under severe impact, thus absorbing part of the force of impact without substantial rebound.

In the optional types of buffer casings that are disclosed, any of the above-described types of impact-movable filler elements may be utilized. In FIG. 4, the resilient casings 80 are half cylinders of molded resilient plastic, with integrally molded resilient-plastic top and bottom and open toward a composite wall that comprises: curved metal strip 74' (which, like the similar strip 74, optionally may be of metal or strong plastic); epoxy glue 82; and upright plywood sheets 15. These casings are flexibly glued together on strip 74' with liquid rubber cement or paste, preferably mixed with sand or sawdust, and they are also flexibly glued to rubber-and-fabric envelope 72 which envelops them except for their interior openings which are closed by strip 74' after insertion of the filler elements (76 or the like). In FIG. 7 the rubber-and-fabric sheath 72 houses springs of weakly resilient steel which optionally are embedded in fibers 76, globules 78 or slightly resilient foam rubber or other foamed plastic.

In the currently, preferred cushioning shield shown in FIGS. 15 and 16, numerous weakly resilient tubes 84, which extend up to the window level of the vehicle, and are also on the lower parts of the doors, may be made like common rubber hose, except that they are of much larger diameter than this hose and preferably comprise only one ply of fabric; alternatively they may be of extruded rubber. They are housed in a tough rubber-and-fabric skin 72; and they contain filler elements 76, 78 or the like. Under impact, some of these elements will pack together and may become crushed or break, but some will rise toward the tops of the tubes, which are above the most dangerous level of common impacts to vehicles. Then, when the shock is over: the rubber-and-fabric tubes will resume their cylindrical shape; the filler elements that have risen will slowly settle back; and these or other upper elements will fill the spaces left due to the packing together or breakage of some of the elements. There will thus be little or no fast rebound of the bumper.

Initially, the small, shock-absorbing filler elements are loosely stored in the resilient-walled receptacles, preferably with small empty spaces of the type shown at 85, in the tops of the receptacles. In usage, they become more settled—by gravity and shocks—but remain somewhat loosely contiguous; and the empty space 85 remains above the normal levels of impacts.

FIG. 8 illustrates a cushioning shield which comprises rubber-and-fabric tubes 86 that are similar in construction to tubes 84, but they extend horizontally around the craft. They contain shock-absorbing filler elements 76, 78 or the like and are housed in rubber-and-fabric skin 88.

FIG. 8 also shows an optional form of the composite vehicle skin means. This comprises: mesh 90, which may be expanded metal (of aluminum alloy or steel) or other metallic network, such as hardware cloth, or fence wiring (in two or more plies); concrete stucco 92, comprising lightweight aggregate such as vermiculite, cinders, expanded shale or clay, and an outer layer of flexible rubber or other flexible plastic, 94. Although no mesh is specifically shown on the inside of the upright wall, metallic mesh is preferably included in the reinforced, lightweight-aggregate concrete stucco 96, so that the cans 97 and 97' are housed between two layers of mesh-reinforced stucco, as cans 98 and 99 are housed. The smaller cans 98 (or 97') optionally may have bolts 100 in the spaces between them. These bolts extend from one layer of mesh to the other and nuts are tightened on their screw-threaded ends, thus tensioning the mesh, before the stucco is applied. The stucco layer 92' goes over the nuts; and in portions of the cabin wall away from the sidewheels (not shown in FIG. 8) another layer of stucco covers the bolt heads.

The lower portion of FIG. 8 illustrates part of a sidewheel support. This is shown as comprising especially strong rows of cans, threaded on a long bolt or rod, 102. This rodlike element may be threaded from end-to-end, or only at one or both of its ends. The upper end of the rod shown in FIG. 8 is screw-threaded and topped with nuts 104 and 106 that are screwed toward each other in clamping engagement with mesh 90. Over the nut 106 a glue-holding sleeve is placed; this may be a short piece of plastic hose or pipe, or a short, molded article of plastic. Epoxy glue or putty or other strong glue is placed in this sleeve, sealing the adjacent hole in can 110 and securely bonding the can to the nut and mesh.

The unbolted deck cans 108 and the layers of deck mesh 90 have been previously assembled and glued together in accordance with the structure and method illustrated in FIGS. 9 and 10 and later described; and it is while these are temporarily upside down on a benchlike fixture that rods 102 are threaded thru the wheel-supporting cans and strongly fixed to the mesh and row of cans 110, 98 and 99 with nuts, glue-holding sleeves, and adhesive putty. This putty, 112, preferably comprising epoxy, is inserted into the sleeve, over the nut 114, and is mounded above the rim of the sleeve, so that when the can 98 is threaded into place over the rod some of the putty is forced into the adjacent hole in this can, thus sealing, and, after setting, strongly holding the adjacent can-end caps together. As indicated in the similar cans 110' of FIG. 15, fore-and-aft rows of cans (110, 98, 99, etc.) of FIG. 8 are preferably in streamlined fore-and-aft juxtaposition. Nuts 114, enveloped in putty 112, optionally may be thus used; or the sealing and holding putty for the can-end cap at the pairs of caniend caps below nut 106 may be like that illustrated at 112', which is deeply placed over an end cap, in a glue-holding sleeve that does not house a nut.

After the glue-united alternating cans 98 and 99 are continued to the bottom of the can rows, the threaded rods or long bolts there are extended thru holes in a bottom plate, and the rodlike elements are tensioned by a nut that is similar to nut 104. The removable bottom plate of the wheel support, apertured to provide room for the wheel, may be of epoxy-coated plywood, or comprise mesh which like mesh 90 is impregnated and coated with lightweight stucco.

Unlike the outer sidewheel-supporting cans 116 and 118 of FIGS. 15 and 16, the outer can-rows or tubular members, 110-98-99, shown in FIG. 8 are offset toward the longitudinal axis of the vehicle from the cabin wall that comprises cans 97 and 97'; and the outer wheel-supporting wall structure comprises: stucco-impregnated mesh 120; foamed plastic 122, preferably of the rigid or semirigid type; optional, wall-reinforcing metal rods, 123, that have angled upper ends that are screw-threaded and clamped to mesh 120 by nuts; and the outer, flexible sheet 94. The cans of the cabin wall tubular members (97, 97', etc.) optionally may be joined in the manner indicated in FIG. 2 or FIG. 18; or as in FIG. 8 they may be threaded on and clamped between the ends of rods 126. And instead of these cans any of the other disclosed forms of the short or elongated cans may be used in the construction of this lightweight cabin wall of FIG. 8.

In FIGS. 5 and 6 other, optional forms of the wheel supports are shown. In FIG. 6 the wheel sidewall rows of cans (128, 130, etc.) are bolted to the deck and slanted downward and inward toward the wheel that is on axle 132, thus bracing the axle-bearing-supporting angle iron 134 against fore-and-aft movement. The wall that comprises these sidewall rows of cans and the skin 136 (of rubber or other plastic or plastic-and-fabric) is streamlined in front and to the rear of the wheel.

FIG. 5 shows a similarly slanted and streamline sidewall that comprises: outer, streamlined, metal walls 138 that are welded and/or bolted to the angle irons 140. These metallic angles slidingly support the wheel axle bearing 142 when it rises against shock absorber 144. Any known type of wheel bearing and shock absorber may be substituted for the somewhat schematically illustrated bearing and shock-taking element of FIG. 5.

The rubber-tired front wheel 6 is shock-absorbingly mounted and turned for steering in the general manner of mounting and steering motorcycle wheels. The axle of this wheel 6 rotates in bearings 146 that are supported in a motorcycle-type steering fork, 148. This fork is fixed, via tubular shaft 150, to the hand steering wheel 7. When the vehicle is mainly used as an aircraft the wheel 6 is thinner, of much larger diameter, projects farther below the bottom 16, and is used to steer the vehicle both on the ground and in the air. In this event the rear wheel also is increased in diameter and is used for propulsion on the ground and directional stability in the air.

The wheel 8 is fixed to an axle that is driven from the box 152 which contains bearings and gears. These gears are actuated by the drive shaft 154, which rises into the cabin and is driven from an engine or motor that is mounted on the after part of the deck.

The power means may comprise an internal combustion engine and/or an electric or fluid motor. When the motor is electric it may receive power from a generator that is driven by an internal combustion engine and/or by batteries. In FIG. 1 numerous storage batteries are shown at 156. To lessen roll-inducing moments these batteries are preferably mounted as closely as possible to the longitudinal axis of the craft; and the center of gravity of the group of bearings is preferably at or near the center of gravity of the remainder of the vehicle.

The bearings are supported, preferably below the deck, by strong boxes 158 of epoxy-coated wood (or of metal), having hinged covers for installation or removal of the batteries.

These covers optionally may be hinged either upward thru trapdoors in the deck or downward for battery removal when the vehicle is jacked up.

During most of the land travel of the vehicle it is largely stabilized against rolling, so that except in turns the sidewheels 9 remain clear of the ground 160, as indicated in FIG. 5. This stabilization is achieved partly by the gyroscopic effect of wheels 6 and 8, but mostly because of the balloons 162. The aerostatic lift of these balloons is centered at or near the vertical plane that contains the vehicle's longitudinal axis. Optionally, the balloons, filled with helium or hydrogen that is mixed with a small percentage of combustion-inhibiting gas, are surrounded by foamed plastic, 164; or, as shown in FIG. 16, they may be placed above a thin, lightweight fabric, 166, without being imbedded in foamed plastic. As shown, a plurality of these balloons are arranged transversely of the vehicle, and preferably they are also pluralized along the fore-and-aft length of the craft. Their very thin walls may be of balloon cloth, rubber or other plastic.

Optionally, this lifting-force stabilization, in the vehicle of either FIG. 3 or FIG. 16, may be augmented by aerodynamic lift of the type illustrated in FIG. 13, in which the craft's forward part is on the viewer's left. The top of the vehicle is aerodynamically curved as shown at 168. This curve is the upper surface of the lightweight stucco (or equivalent epoxy) 170 that coats and impregnates the metal mesh 172. The shape of this winglike surface is largely determined by the tubes or the larger cans of rows of cans, 174, that are made in different diameters to generally conform with the aerodynamic shape. These tubes or rows are thickly glued to the epoxy-coated mesh 176, which is also epoxy glued to the plate 178 (of metal or plywood) that is fixed to the upright cabin sidewall tubes or rows of cans 180.

In addition to the vacuum-producing top lift of surface 168, a bottom, aerodynamic pressure lift may be provided by inclining a lower surface or lower surfaces of the cabin as generally indicated at 182 in FIG. 14. Here the forward part of the vehicle is on the viewer's left. The deck-attached tubes or rows of cans 184 are transversely arranged in two layers. The lower layer comprises rows of cans that are of different diameters, and are bottom sheathed by metallic mesh that is coated and impregnated with stucco or epoxy. Unless the vehicle is intended to travel mainly in the air this lower pressure-causing surface is not preferred. In any event, the lift-stabilized craft optionally may be powered by a rocket motor at its stern or a motor and screw propeller mounted on the top of the cabin.

FIGS. 15 and 16 illustrate the invention as incorporated in a three-wheeled vehicle. The front wheels 184 are shown as mounted for steering in bearings and pivoted steering forks, each of which is similar to the motorcycle-type fork of FIG. 1. But in FIG. 15 the steering forks are turned in unison by pivoted levers or sprocket drives on or in the cabin deck that are connected to a forward, centrally located hand wheel (not shown) that is similar to the wheel 7 of FIG. 3. Alternatively, any other known type of steering front wheels may be used—for instance, the presently common means for steering front automobile wheels.

The axle 186 of the driving wheel 188 is driven from an engine or motor at the rear part of the cabin by means of the universal shaft 190 and a power transmission in gear case 192. Metal elements 194 strongly attach this gear case to the low, inner, vehicle-strengthening wall 196, thus bracing this wall and the cabin against the thrusts of the wheels and transmission. The wall 196 comprises a selected form of the invented cylindrical or corrugated tubes or can rows, 198.

In FIGS. 15 and 16 small diameter pieces of bamboo or thin-walled, plastic or metal tubes are shown at 200. These are filler and wall-strengthening elements of the type that may be placed between the larger tubes or can rows of any of the wall or deck frames of FIGS. 1 to 16.

FIGS. 9 and 10 illustrate an optional type of horizontal deck or upright wall frame. This comprises: cans 202, whose axes are upright when the structure is used in a sidewall, or horizontal when in a deck or vehicle top; bits 204 of epoxy or other adhesive putty, gluing the ends of the cans to sheets of metallic mesh, 205 and 207; stucco of one of the above-described types (comprising portland cement or epoxy resin) coating and impregnating the sheets of mesh; and, preferably, a layer of sheet rubber or other plastic on any exposed, exterior surface of the wall.

The wall frame structures of FIGS. 11 and 12 also optionally may be used in either decks or sidewalls. In FIG. 11, two similar types of corrugated, sealed, gas-containing cans, 206 and 208, are shown. These may be either pipes or the shorter cans that are glued and jointed in a tubular member (or row). Like can 208, they optionally may be made by the extrusion of metal or of dense, fiber-reinforced plastic. Or, like can 206, they may be of mandrel-formed corrugated aluminum or galvanized-iron sheet with the adjoining side edges welded, epoxy glued, brazed or soldered together, as at 209. To each end of each of these tubes an end cap, comprising a tube-bordering flange, is welded, brazed, soldered or epoxy glued. The flange 210 of tube 208 is rectangular; and the flange 212 of tube 206 is a disc. Other shapes of the flanges may be utilized. For example, where the cans are joined in an arcuate wall the contacting areas of each pair of the flanges are preferably in a straight line (somewhat like the line of square flange contact 214, but making an angle with the mesh 216 that is not a right angle), and the mesh and the bordering lines 214 of mesh and flange then are in the desired arc.

Preferably, the contacting edges of the pairs of flanges are epoxy glued, with the cement or putty covering their lines of contact. Alternatively, the flanges may be overlapped and bolted (or riveted) and/or glued together. The bolts 217, extended thru the mesh before stucco is applied to it, tightly clamp it against the flanges. Other bolts (or threaded rods), 218, optionally may extend thru the top and bottom flanges of the tubes and aid in strongly tying these flanges and the corrugated tube walls together. Also optionally, these rodlike elements 218 may extend thru the vehicle deck and top and, with nuts, clamp the assembly together. Preferably the flanges 210 and 212 are epoxy glued to the deck and top.

After the mesh is stuccoed foam plastic liquids are poured thru a closable hole into the spaces around the cans and bolts. For convenience of illustration, this foamed plastic, 220, is shown as surrounding the can rows or tubes only in FIGS. 1, 8 and 10; but preferably this insulating, wall-strengthening foamed plastic is placed between each adjacent pair of imperforate skins and around all the can rows (or tubes) and small diameter filler elements of bamboo or pipe that are indicated in FIGS. 1 to 21. The insulating type of lightweight concrete, 221, that is shown around the cans in FIG. 6 optionally may be replaced by foamed plastic. The concrete 221, if used, preferably comprises aggregate of expanded clay or shale or other pellets that contain gas.

The gas in any of the tubes or cans shown in these FIGS. optionally may be under above-atmospheric pressure. It is preferably lighter than air, but optionally may be air.

In FIG. 12 (a view in section along a plane that is parallel to the axes of the tubular articles there shown), the gas-containing cans 222, illustrated as partly broken away, may be elongated or short. The end caps or flanges 223 are shown as optionally attached to the two parallel sheets of mesh, 224, by epoxy putty 226 and/or bolts 228. And the flanges at the wall interior junctions of adjoining pairs of cans are epoxy glued and/or bolted together. In the top part of this FIG., the wall interior end caps of four juxtaposed cans are shown as joined by a single bolt, 230. The end caps of one pair of adjoining, coaxial cans have semicircular cutout or drilled-out recesses that fit around half of the bolt 230 and join in a circle with like recesses of the other pair of coaxial cans. These end caps are further fastened together by epoxy or other strong, adhesive putty, 232.

Within the scope of the subjoined claims, various changes may be made in the specific disclosed structure. For instance, the middle portions of the outer sidewalls of the vehicle of FIG. 1 may be parallel and straight, instead of curved as, indicated in FIG. 1; and in this event, the rear end preferably is still pointed and streamlined, and the front end preferably also remains in streamlined or nearly streamlined shape.

In the claims: the word "can" or the term "tubular member" is used to signify any elongated or short tubular article of any cross-sectional shape or material (for example, a can, row of cans or pipe); the words "gaseous material" means any pure gas, mixture of gases, or gas-containing plastic (for example, gas-cell-containing foamed plastic); the term "foamed plastic" signifies any synthetic or latex-containing foamed plastic; the word "stucco" means cement that is mixed or unmixed with aggregate, whether the cement is portland cement, epoxy or other resinous glue, mixed with powder or other aggregate, epoxy or other putty or the like; and the word "upright" means substantially vertical or slanting.

I claim:

1. A lightweight, heavier-than-air vehicle, having a longitudinal axis, adapted to travel over land, and having:
    body structure comprising: skin means; framework having tubular members; gaseous material in said members; a rear wheel support, adapted to mount a rear wheel for rotation approximately in a plane containing said longitudinal axis; a front wheel support, adapted to mount a front wheel for rotation approximately in said plane; and a pair of sidewheel supports, located on opposite sides of said axis;
    a rear wheel, rotatably connected to said rear wheel support;
    a front wheel, rotatably connected to said front wheel support;
    a pair of sidewheels connected to said sidewheel supports, said sidewheels and sidewheel supports being constructed and arranged to provide clearance between both sidewheels and the ground during normal land travel of the vehicle over a substantially level surface, and to allow rolling, stabilizing engagement of a sidewheel with the ground on sidewise tipping of the vehicle by a substantially predetermined amount; and
    stabilizing means, facilitating stabilization of said body structure and vehicle against rolling, vehicle-tipping motions, comprising lighter-than-air balloon means, connected to an upper part of said body structure, exerting aerostatic lift on said structure, and having a center of lift approximately located in said plane.

2. A vehicle as set forth in claim 1, in which a plurality of said tubular members comprise upright, juxtaposed, jointed, sealed elements that have: tubular walls, containing chambers that inclose said gaseous material; and partitions forming ends of said chambers, separating them from each other, and providing strength-providing joints in said tubular members.

3. A vehicle as set forth in claim 2, in which each of said chambers is in a can, and each of said partitions comprises a pair of closely adjacent end caps of said cans and bonding material, securely holding faces of said end caps together.

4. A vehicle as set forth in claim 3, in which said bonding material comprises strong glue.

5. A vehicle as set forth in claim 3, in which: each adjoining pair of said end caps are of different areas; each end cap comprises a portion that is indented from an end of the can to which it is attached and toward the center of the can, thus forming a can-end recess; the smaller end cap of each pair nests within the larger end cap of the pair; and said bonding material comprises strong glue in the larger of said recesses and between said end caps.

6. A vehicle as set forth in claim 1, in which said tubular members comprise corrugated walls.

7. A vehicle as set forth in claim 1, in which: said skin means comprises two adjacent skins; at least some of said tubular members are located between said skins and have walls that are curved; some of the tubular members are closely juxtaposed to one of said two skins and to each other, and form V-shaped recesses between their curvatures; others of the tubular members are closely juxtaposed to the other one of said two skins and comprise a tubular member that is closely nested in each of said recesses between curvatures, strengthening said framework.

8. A vehicle as set forth in claim 1, in which each of said tubular members comprises corrugated walls.

9. A vehicle as set forth in claim 1, in which said body structure comprises a top, having an upper, exterior surface that is shaped to exert an aerodynamic lifting force on said top and body structure, and in which the normal center of lift of said aerodynamic force is approximately located in said plane.

10. A vehicle as set forth in claim 1, in which said body structure further comprises an impact-resistant buffer extending around at least a substantial portion of said framework, projecting outward from the framework in position to bear the brunt of forceful contact between the vehicle and other objects, comprising:
receptacles having resilient walls that are curved convexly toward shocks from other objects;
in each of said receptacles, a multiplicity of small, separate, contiguous, shock-absorbing filler elements;
said receptacles and shock-absorbing elements being constructed and arranged to cause a portion of said elements to rise in the receptacles when said convexly curved walls are partially collapsed inward under impact.

11. A vehicle as set forth in claim 10, in which said shock-absorbing elements are crushable filaments.

12. A vehicle as set forth in claim 10, in which said shock-absorbing elements are in the form of pellets.

13. A vehicle as set forth in claim 10, in which said receptacles comprise elongated, upright, hollow members, and said shock-absorbing elements are loosely positioned in said members, capable of being settled together under the forces of gravity and shocks.

14. A lightweight, heavier-than-air vehicle adapted to travel over land, comprising:
floor structure, having an upper, load-supporting surface;
load-confining sidewall structure, connected to said floor structure, comprising: a plurality of sealed, upright, juxtaposed, jointed, vehicle-strength-providing tubular members, each of which comprises a plurality of end-to-end joined cans, having walls of dense material that is substantially impermeable to gas, means securely fastening adjoining can-ends together in tube-strengthening partitions that bridge across the center of the tubular member, and gaseous material within said cans; means, comprising skin structure, holding said tubular members in vehicle strength providing relation to each other and to said deck structure; and cell-containing, insulating material in strengthening contact with said skin structure and tubular members;
top structure bracingly connected to said sidewall structure; and
means, projecting below and connected to said floor structure, for facilitating travel over land.

15. A vehicle as set forth in claim 14, in which said cans have thin, curved walls of metal.

16. A vehicle as set forth in claim 14, in which said cans have curved walls of dense plastic.

17. A vehicle as set forth in claim 14, in which said cans have corrugated walls.

18. A vehicle as set forth in claim 17, in which cross-sectional planes containing the axes of said tubular members intersect said corrugated walls in sinuous curves.

19. A vehicle as set forth in claim 17, in which cross-sectional planes that are transverse to axes of said tubular members intersect said corrugated walls in sinuous curves.

20. A vehicle as set forth in claim 14, in which said gaseous material is gas.

21. A vehicle as set forth in claim 14, in which said gaseous material comprises cell-containing insulating material.

22. A vehicle as set forth in claim 21, in which said insulating material comprises foamed plastic, having closed gas cells.

23. A vehicle as set forth in claim 14, in which said means for facilitating land travel comprises front and rear wheels that are mounted for rotation approximately in a plane containing the longitudinal axis of the vehicle, and in which said vehicle further comprises lighter-than-air balloon means for exerting aerostatic lifting force on said structures, aiding in stabilizing the vehicle, having a center of lift that is located above a horizontal plane that contains the center of gravity of the vehicle.

24. A vehicle as set forth in claim 14, in which said means for facilitating land travel comprises: a front wheel on each side of the longitudinal axis of the vehicle; and a rear wheel that rotates approximately in a plane that contains the center of gravity of the vehicle.

25. A vehicle as set forth in claim 14, further comprising balloon means for exerting vehicle-stabilizing aerostatic force on said structures.

26. A vehicle as set forth in claim 14, in which said top structure has an upper skin and surface that are shaped and arranged to exert an aerodynamic lift on the vehicle when it is in forward travel.

27. A lightweight, heavier-than-air vehicle, having a longitudinal axis, adapted to travel over land, and having:
body structure comprising: framework; a front wheel support, adapted to mount a front wheel for rotation approximately in a plane containing said longitudinal axis; and rear wheel support means adapted to support rear wheel means;
a load-supporting front wheel, rotatably connected to said front wheel support;
rear wheel means, rotatably connected to said rear wheel support;
means located at a side of the bottom of said body structure for vehicle-stabilizing engagement with the ground on a sidewise tipping of the vehicle by a predetermined amount; and
stabilizing means, facilitating stabilization of said vehicle against rolling, vehicle-tipping motions, comprising lighter-than-air balloon means, connected to an upper part of said body structure, exerting aerostatic lift on said structure, and having a center of lift approximately located in said plane.

28. A vehicle as set forth in claim 27, in which said front wheel is a vehicle steering wheel, and the vehicle further comprises means for pivoting the front wheel for steering.

29. A vehicle as set forth in claim 27, comprising means for driving said rear wheel means in propelling the vehicle.

30. A vehicle as set forth in claim 27, in which said rear wheel means comprises a wheel mounted for rotation approximately in said longitudinal plane.